(12) United States Patent
Wu

(10) Patent No.: US 8,113,463 B2
(45) Date of Patent: Feb. 14, 2012

(54) BLIMP

(76) Inventor: Man Ji Wu, Linluo Township (TW)

( * ) Notice: Subject to any disclaimer, the term of this patent is extended or adjusted under 35 U.S.C. 154(b) by 308 days.

(21) Appl. No.: 12/572,271

(22) Filed: Oct. 2, 2009

(65) Prior Publication Data

US 2010/0140391 A1  Jun. 10, 2010

(51) Int. Cl.
*B64B 1/02* (2006.01)
(52) U.S. Cl. ............................................ 244/96; 244/30
(58) Field of Classification Search .................. 244/96, 244/30
See application file for complete search history.

(56) References Cited

U.S. PATENT DOCUMENTS

| | | | | |
|---|---|---|---|---|
| 6,119,979 A * | 9/2000 | Lee et al. | ......................... | 244/97 |
| 6,811,115 B2 * | 11/2004 | Kurose | ............................. | 244/97 |
| 7,093,789 B2 * | 8/2006 | Barocela et al. | ................. | 244/30 |
| 7,654,073 B2 * | 2/2010 | Primlani | ..................... | 60/39.183 |
| 7,887,007 B2 * | 2/2011 | Mitchell | .......................... | 244/30 |
| 2008/0179454 A1 * | 7/2008 | Balaskovic | ...................... | 244/30 |
| 2009/0072078 A1 * | 3/2009 | Choi et al. | ...................... | 244/30 |
| 2009/0294576 A1 * | 12/2009 | LaForge | .......................... | 244/30 |
| 2010/0102164 A1 * | 4/2010 | Brutoco | .......................... | 244/30 |

* cited by examiner

*Primary Examiner* — Christopher P Ellis

(57) ABSTRACT

An airship includes an airbag, a control cabin disposed on a lower portion of the airbag, a propel device mounted to a rear portion of the control cabin and a power control system disposed in the control cabin. The propel device includes a propeller for providing moving power to the airship and multiple compressors each having a spray nozzle connected thereto for providing air stream to change the moving direction of the airship. The power control system includes multiple solar energy boards secured on and outer periphery of the airship for transferring the solar energy into direct current that is used as an energy source of the airship.

7 Claims, 5 Drawing Sheets

BLIMP

BACKGROUND OF THE INVENTION

1. Field of the Invention

The present invention relates to and airship, and more particularly to an airship that has improved flying propel and steering control system.

2. Description of Related Art

The Zeppelin rigid airship is an early stages aircraft that uses the air floating power, forced thereon, as a levitating power, and has a control system and a propelling system. Evolved to nowadays, the airship usually includes a propel fan system that is driven by an air engine. In general, the airship has a large main airbag containing air that has a specific gravity smaller than that of the atmosphere, such as hydrogen and helium. However, the hydrogen is inflammable and easily exploded such that the modern airship usually uses helium. The main airbag has two sides each having a vice-airbag disposed thereon for containing air. The integral specific gravity must be smaller than the atmosphere when the airship needs to be levitated such that the valve of each of the two vice-airbags is opened. As a result, the air in the vice-airbag is exhausted due to the pressure of the helium in the main airbag and the airship is gradually levitated because the expand density of the helium is reduced. On the contrary, the integral specific gravity must be greater than the atmosphere when the airship needs to be come down such that the valve of each of the two vice-airbags is closed and the air pump is operated. As a result, the air is pumped into the vice-airbags to compress the volume of the helium in the main airbag and the airship is gradually falling down because the compress density of the helium is raised.

A conventional airship in accordance with the prior art shown in FIGS. 1 and 2 comprises a spindle-shaped main body that is made of intensified nylon cloth for containing helium. A top exhaust valve is mounted to a back of the main body. A pair of horizontal wings and a pair of vertical wings are respectively disposed on a rear portion of the main body, wherein the top exhaust valve, the pair of horizontal wings and the pair of vertical wings are controlled by cables. A hole is defined in a bottom of the main body and a sleeve is connected to an inner periphery of the hole. A suspension system includes two strain plates, multiple steel ropes and a frame. A burn system includes a flame projector, a blower and a socket. A propel system includes a cockpit that includes seats, an engine, fuel gas containers and multiple cables that control the top exhaust valve, the horizontal wings and the vertical wings. The cockpit has two opposite sides each having a propeller mounted thereon. The train plates of the suspension system is secured on the back of the main body and the steel ropes are provides for hanging the burn system and the propel system. The blower makes the main body be spindle-shaped and the flame projector provides hot air into the main body for levitating the main body. Then, the airship is controlled by the propellers, the pair of horizontal wings and the pair of vertical wings.

The airship, hereinbefore, is a combination of the Zeppelin airship and the hot air balloon. As a result, both of the power sources of levitation and the steer system are conventional such that the conventional airship is unstable and has a slow speed. In addition, the conventional air ship does not match to the environmental protection concept and needs to be advantageously altered.

The present invention has arisen to mitigate and/or obviate the disadvantages of the conventional air ships.

SUMMARY OF THE INVENTION

The main objective of the present invention is to provide an improved airship that can be conveniently and stably operated and controlled.

To achieve the objective, the airship in accordance with the present invention comprises an airbag for containing helium, a control cabin disposed on a lower portion of the airbag and a propel device mounted to a rear portion of the control cabin that is divided into a control room, a passenger cabin and a motive power room, and a power control system disposed in the control cabin. The propel device is disposed in the control cabin and includes a propeller and multiple compressors equally surrounding the propeller, wherein the propeller provides power for moving the airship. The multiple compressors are divided into a left turn group and a right turn group, wherein each compressor includes a spray nozzle. The airship is left turned/right turned due to the air stream from the spray nozzles of the compressors of the left turn portion/right turn group. The power control system includes multiple solar energy boards, a battery and an inverter. The multiple solar energy boards are secured on and outer periphery of the airship for transferring the solar energy into direct current that is provided into the control cabin. The inverter transfers the direct current into an alternating current for the propel device. The battery stores the electric power from the multiple solar energy boards.

The airship in accordance with the present invention is answered to the environmental protection concept because the power of the propel device, the power control system and the various electric systems of the airship is provided by the solar energy boards. In addition, the solar energy is inexhaustible such that the airship in accordance with the present invention answers to the economical benefit. The airship of the present invention uses the air stream from the propel device to steer and control the moving direction such that the airship in accordance with the present invention can be conveniently and stably operated and controlled.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 3 to 5, an airship in accordance with the present invention comprises an airbag (10), a control cabin (20) disposed on a lower portion of the airbag (10), a propel device (30) mounted to a rear portion of the control cabin (20) and a power control system (40) disposed in the control cabin (20).

The airbag (10) is oval-shaped and provided for containing hydrogen or helium. Two vice-airbags (not shown) can be selectively disposed to two opposite side of the airbag (10) for controlling the height of the airship. However, the vice-airbag is conventional such that the vice-airbag is not described in detail in the specification.

The control cabin (20) is divided into a control room, a passenger cabin, a motive power room, etc. There are multiple panels (21) is disposed in the control room, such as a pressure panel, a compass panel or a longitude/latitude panel. The motive power room is situated in a rear portion of the control cabin (20) for being connected to the propel device (30).

The propel device (30) includes a propeller (31) and multiple compressors (32), wherein each compressor (32) includes a pressure booster (33) and a spray nozzle (34). The rotating propeller (31) makes the airship being moved forward. The compressors (32) with the corresponding pressure booster (33) and the spray nozzle (34) equally surround the propeller (31), and are divided into a left turn group and a right turn group. The airship is left turned/right turned due to the air stream from the spray nozzles (34) of the compressors (32) of the left turn portion/right turn group. Each spray nozzle (34) is exposed and connected to the corresponding one of the pressure booster (33) for promoting the pressure of the air stream from the nozzle (34).

With reference to FIG. 6, the propel device (30) includes a steer controller (35) provided for controlling moving direction of the airship. The steer controller (35) is divided into a left turn portion (351) and a right turn portion (352), wherein the left turn portion (351) is electrically connected to the compressors (32), the pressure boosters (33) and the spray nozzles (34), respectively grouped into 1, 2, 3, and 4, of the left turn group, and the right turn portion (352) is electrically connected to the compressors (32), the pressure boosters (33) and the spray nozzles (34), respectively grouped into 5, 6, 7, and 8 of the right turn group, as shown in FIG. 6. The spray nozzles (34) of the left turn portion (351), grouped 1, 2, 3 and 4, are sequentially connected to the spray nozzles (34) of the right turn portion (352), grouped 5, 6, 7 and 8 by paths (not shown). As a result, the air pressure in the spray nozzles (34) of the left turn group is zero and the air stream in the spray nozzles (34), grouped 1, 2, 3 and 4, are sequentially flow into the spray nozzles (34), grouped 5, 6, 7 and 8, via the paths when the left turn portion (351) is closed. Accordingly, the air pressure in the spray nozzles (34) of the right turn group is zero and the air stream in the spray nozzles (34), grouped 5, 6, 7 and 8, are sequentially flow into the spray nozzles (34), grouped 1, 2, 3 and 4, via the paths when the right turn portion (352) is closed.

The power control system (40) includes multiple solar energy boards (41), a power controller (42), a direct current generator (43), a charge controller (44), a battery (45) and an inverter (46) electrically connected to one another.

The solar energy boards (41) are secured on and outer periphery of the airship for transferring the solar energy into direct current that is used as an energy source of the panels (21) of the airship. In addition, the inverter (46) transfers the direct current into an alternating current for the propel device (30). The charge controller (44) is operated to make the battery (45) being charged when the direct current from the solar energy boards (41) is overflowed and the charge controller (44) is closed when the battery is charged to a basic electric potential.

Furthermore, the power controller (42) and the direct current generator (43) are electrically connected to the solar energy boards (41) and the battery (45) such that the direct current generator (43) is operated for generating electric power when the electric potential of the battery (45) is higher than that of the solar energy and the direct current generator (43) is closed when the electric potential of the battery (45) is lower than that of the solar energy.

As described above, the airship in accordance with the present invention is answered to the environmental protection concept because the power of the propel device (30), the power control system (40) and the various electric systems of the airship is provided by the solar energy boards (41). In addition, the solar energy is inexhaustible such that the airship in accordance with the present invention answers to the economical benefit. The airship of the present invention uses the air stream from the propel device (30) to steer and control the moving direction such that the airship in accordance with the present invention can be conveniently and stably operated and controlled.

Although the invention has been explained in relation to its preferred embodiment, it is to be understood that many other possible modifications and variations can be made without departing from the spirit and scope of the invention as hereinafter claimed.

Element List of the Represent Drawing

Figure 1:
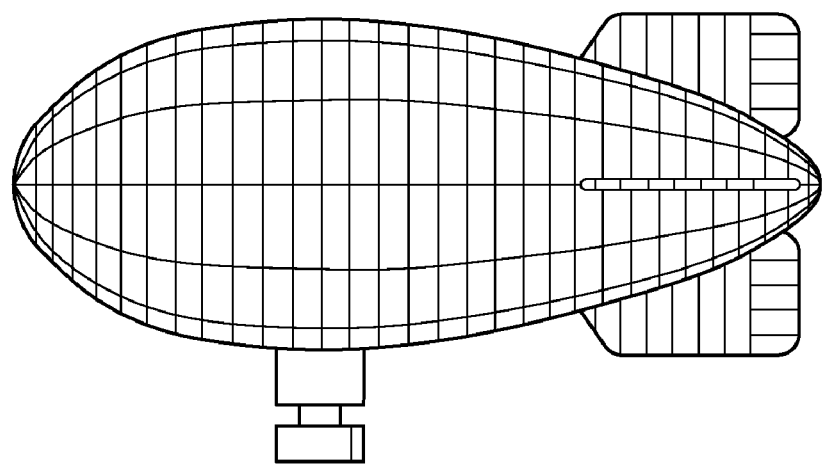
FIG. 1 is a side plan view of a conventional airship in accordance with the prior art.
Figure 2:
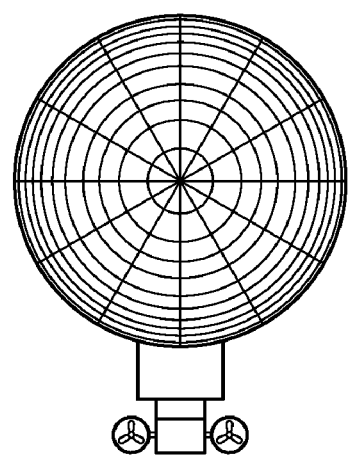
FIG. 2 is a front plan view of the conventional airship in accordance with the prior art.
Figure 3:
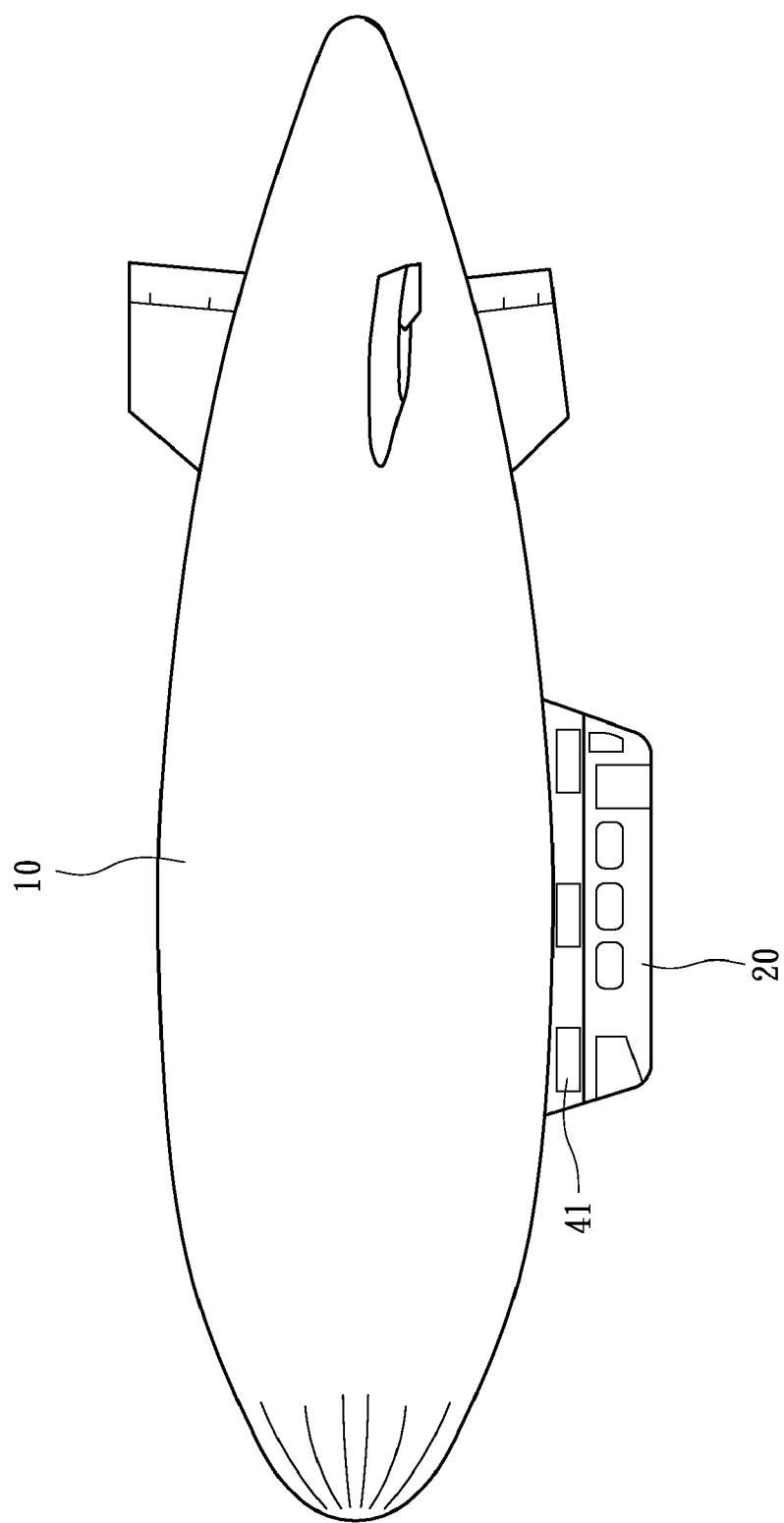
FIG. 3 is a side plan view of an airship in accordance with the present invention.
Figure 4:
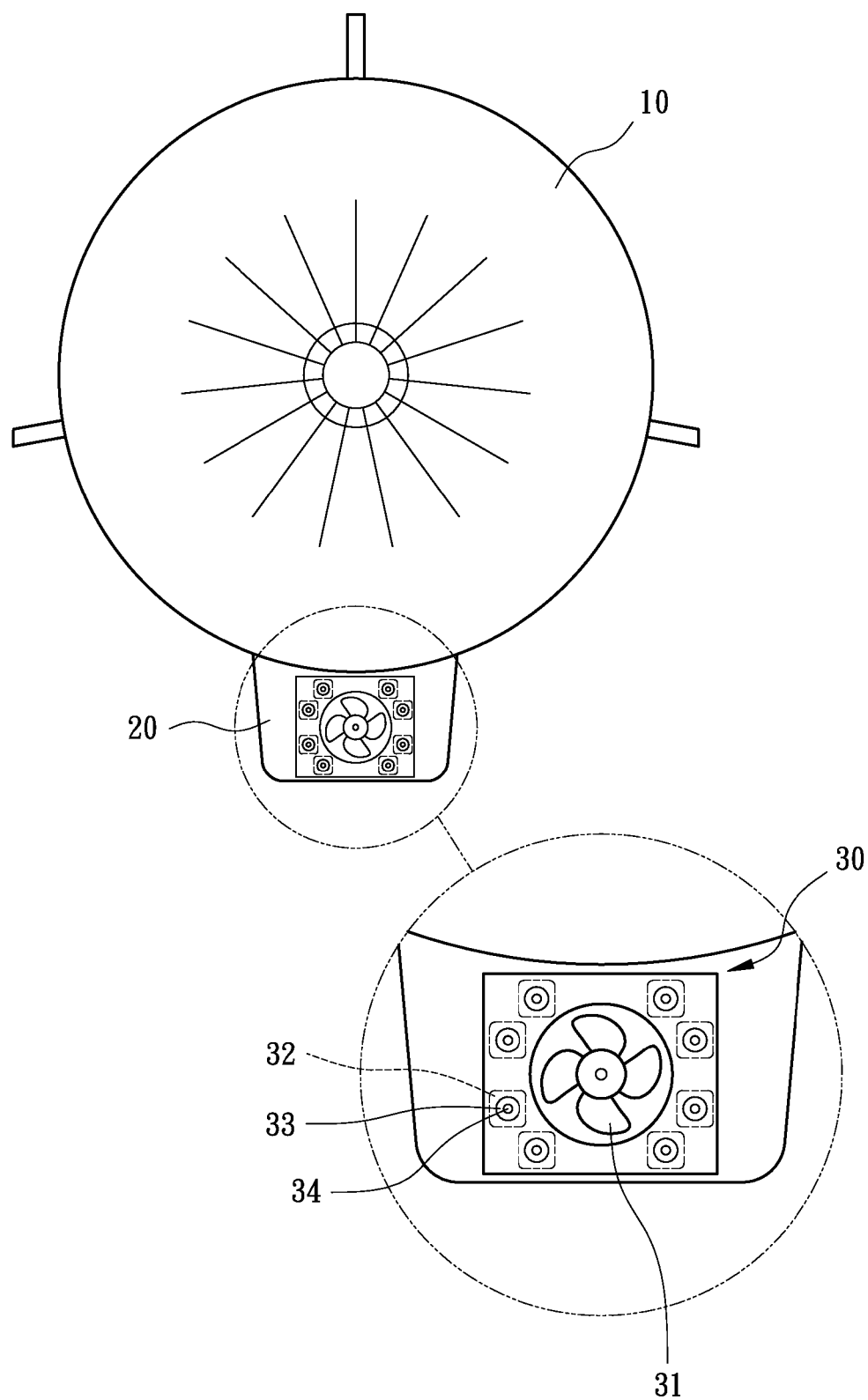
FIG. 4 is a front plan view of the airship in FIG. 3.
Figure 5:
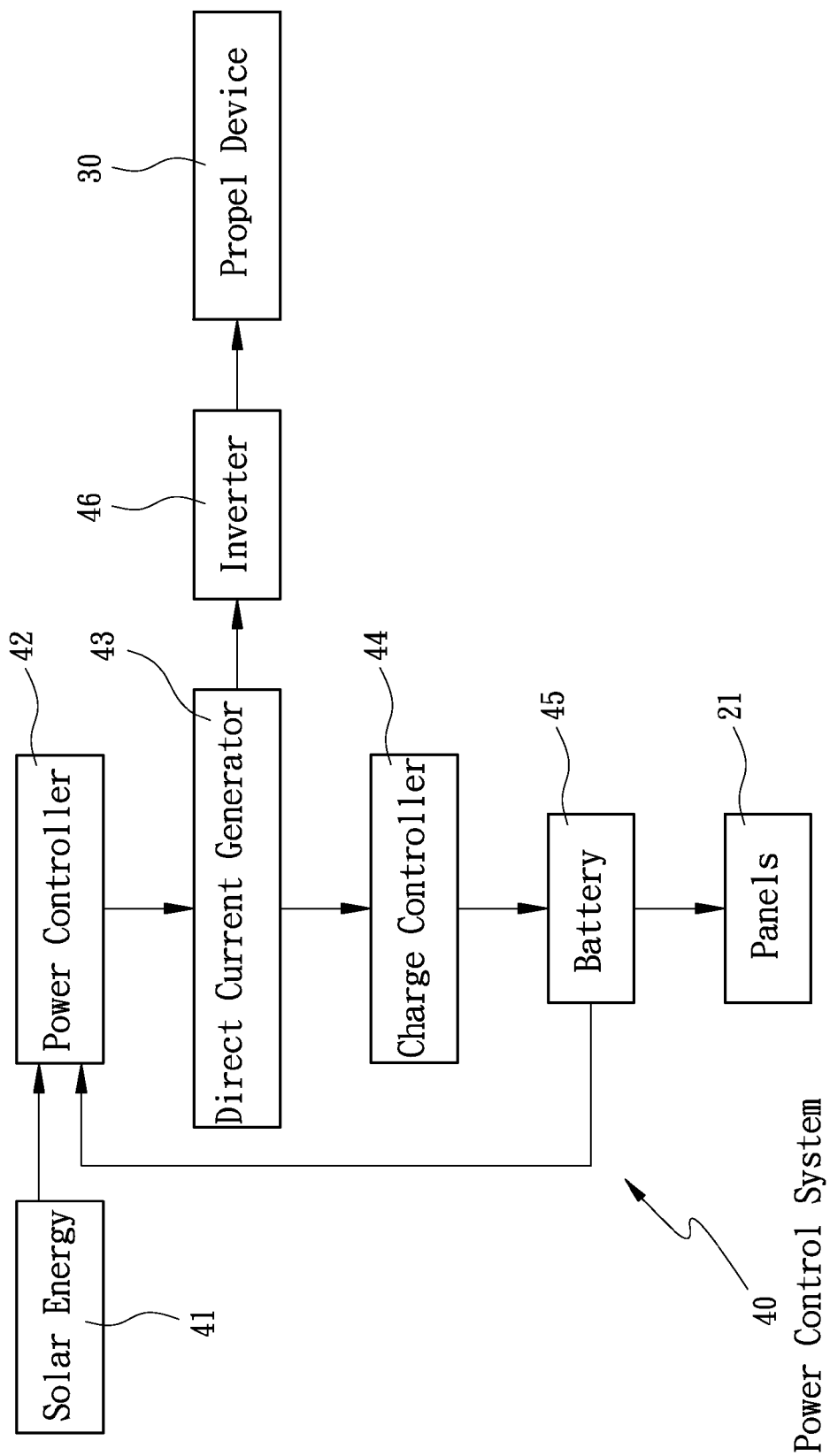
FIG. 5 is a flowchart of a power control system of the airship in accordance with the present invention.
Figure 6:
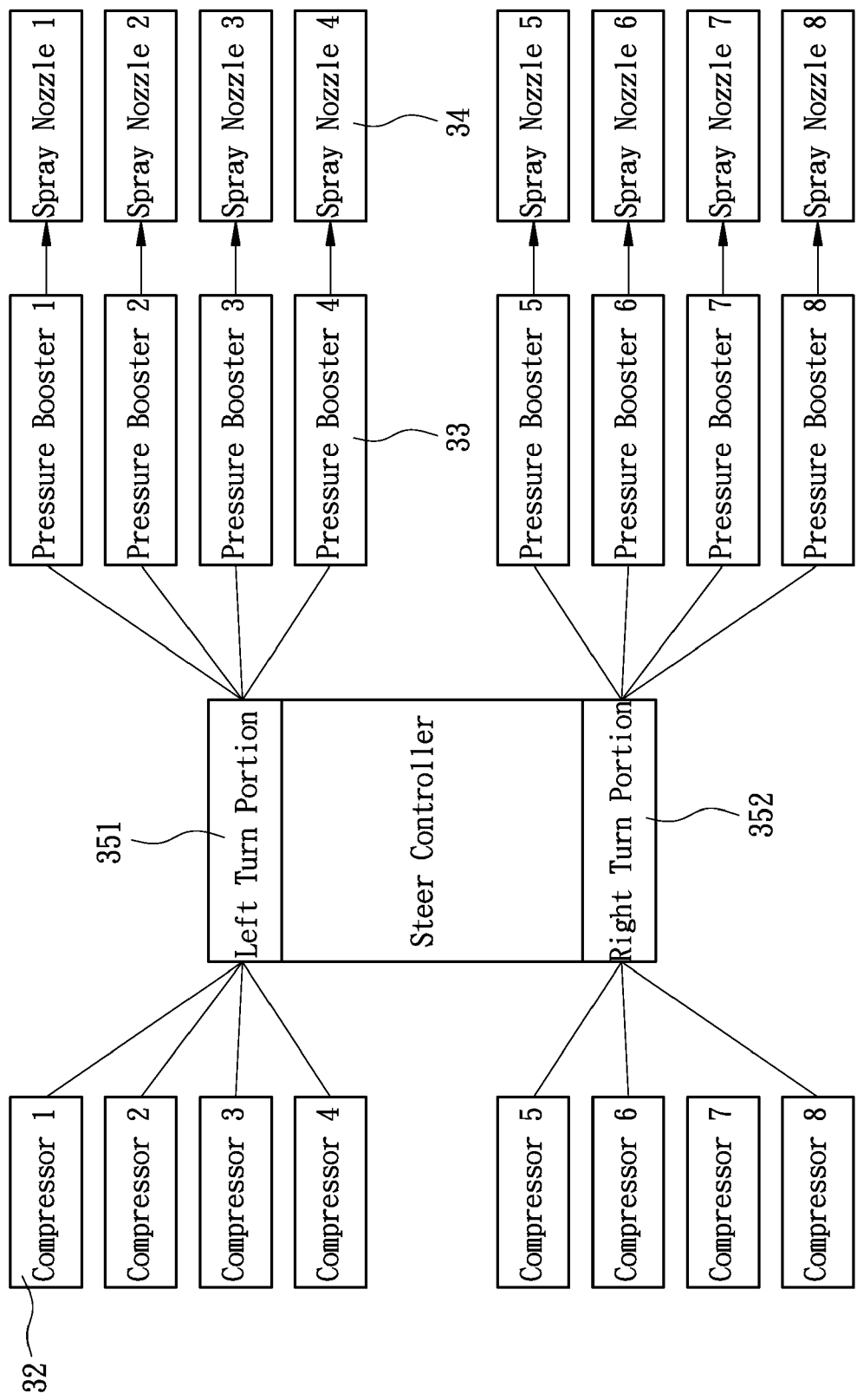
FIG. 6 is a block chart of a steer controller of the airship in accordance with the present invention.

| airbag (10) | control cabin (20) |
| solar energy board (41) | |

What is claimed is:

1. An airship comprising an airbag for containing helium, a control cabin disposed on a lower portion of the airbag and a propel device mounted to a rear portion of the control cabin that is divided into a control room, a passenger cabin and a motive power room, and a power control system disposed in the control cabin, wherein the improvement comprises:

the propel device being disposed in the control cabin and including a propeller and multiple compressors equally surrounding the propeller, wherein the propeller provides power for moving the airship, the multiple compressors are divided into a left turn group and a right turn group, and wherein each compressor includes a spray nozzle, the airship turning left and turning right due to an air stream from the spray nozzles of the compressors of the left turn group and the right turn group; and the power control system including a plurality of solar energy boards, a battery and an inverter, the plurality of solar energy boards secured on and outer periphery of the airship for transferring solar energy into a direct current that is provided into the control cabin, the inverter transferring the direct current into an alternating current for the propel device, the battery storing the electric power from the plurality of solar energy boards.

2. The airship as claimed in claim 1, wherein each spray nozzle includes a pressure booster connected thereto for promoting the pressure of the air stream from the spray nozzle.

3. The airship as claimed in claim 1, wherein the propel device includes a steer controller provided for controlling the moving direction of the airship, the steer controller divided into a left turn portion and a right turn portion, the left turn portion electrically connected to the compressors and the nozzles of the left turn group, the right turn portion electrically connected to the compressors and the nozzles of the right turn group.

4. The airship as claimed in claim 1, wherein the power control system further comprises a power controller and a direct current generator, the power controller electrically connected to the plurality of solar energy boards, the direct current generator and the battery such that the direct current generator is operated for generating electric power when the electric potential of the battery is higher than that of the solar energy and the direct current generator is closed when the electric potential of the battery is lower than that of the solar energy.

5. The airship as claimed in claim 1, wherein the power control system further comprises a charge controller disposed between the direct current generator and the battery such that the charge controller is operated to make the battery being charged when the direct current from the plurality of solar energy boards is overflowed and the charge controller is closed when the battery is charged to a basic electric potential.

6. The airship as claimed in claim 2, wherein the propel device includes a steer controller provided for controlling the moving direction of the airship, the steer controller divided into a left turn portion and a right turn portion, the left turn portion electrically connected to the compressors and the nozzles of the left turn group, the right turn portion electrically connected to the compressors and the nozzles of the right turn group.

7. The airship as claimed in claim 4, wherein the power control system further comprises a charge controller disposed between the direct current generator and the battery such that the charge controller is operated to make the battery being charged when the direct current from the plurality of solar energy boards is overflowed and the charge controller is closed when the battery is charged to a basic electric potential.

* * * * *